United States Patent [19]

McBee

[11] Patent Number: 5,380,023
[45] Date of Patent: Jan. 10, 1995

[54] CHILD'S VEHICLE FOR INCREASED VISUAL INTERACTION

[76] Inventor: Beverlee McBee, 1776 S. Jackson, Ste. 403, Denver, Colo. 80210

[21] Appl. No.: 31,318

[22] Filed: Mar. 15, 1993

[51] Int. Cl.⁶ .................................................. B62B 7/04
[52] U.S. Cl. ............................. 280/87.01; 280/87.05; 280/79.2
[58] Field of Search ............ 5/93.1, 100; 220/8, 220/630; 248/129; 280/87.01, 87.05, 87.051, 638, 35, 47.25, 47.35, 47.34, 47.38, 79.2; 482/27, 77

[56] References Cited

U.S. PATENT DOCUMENTS

| | | | |
|---|---|---|---|
| D. 179,687 | 2/1957 | Johnson | 296/22 X |
| 2,865,647 | 12/1958 | Wilson | 280/79.2 X |
| 3,195,890 | 7/1965 | Salls | 482/77 X |
| 3,302,955 | 2/1967 | Witzgall | 280/79.2 |
| 3,438,642 | 4/1969 | Kite et al. | 280/87.041 X |
| 3,515,404 | 6/1970 | Perego | 280/87.051 |
| 3,664,680 | 5/1972 | Booker | 280/87.041 |
| 4,151,910 | 5/1979 | Yasur | 220/630 X |
| 4,279,043 | 7/1981 | Saunders | 280/87.041 X |
| 4,574,969 | 3/1986 | Mays | 220/8 |
| 4,624,382 | 11/1986 | Tontarelli | 220/8 |
| 4,723,784 | 2/1988 | Muscat | 280/79.2 X |
| 4,733,789 | 3/1988 | Olson | 220/8 |
| 4,836,530 | 6/1989 | Stanley, Jr. | 482/27 |
| 5,040,811 | 8/1991 | Busken et al. | 280/47.34 |
| 5,090,724 | 2/1992 | Fiore | 280/47.38 X |
| 5,183,280 | 2/1993 | Gresch | 280/47.34 X |

*Primary Examiner*—Eric D. Culbreth
*Assistant Examiner*—Michael Mar
*Attorney, Agent, or Firm*—Edwin H. Crabtree; Donald W. Margolis

[57] ABSTRACT

A wheeled vehicle for holding a small child upright in a standing position so that the child has increased visual interaction with the surrounding environment. Also, the vehicle maintains a child's body in a correct, safe and comfortable alignment with his or her head, neck and eye movement positions. The vehicle includes a lower portion of a bottom cylinder mounted on top of wheeled horizontal base frame. Sides of the horizontal base frame extends outwardly from the bottom cylinder and the outer edges of the sides of the base frame act as a bumper should the child's vehicle accidently contact the sides of a wall or other object. An inner circumference of a top cylinder is slidably received around a portion of an outer circumference of the bottom cylinder. The top cylinder is designed to telescope upwardly from the bottom cylinder. The top cylinder is secured to the bottom cylinder using a locking pin. A removable flexible floor is mounted inside the bottom cylinder and is suspended therefrom. The flexible floor provides a "shock absorber" type suspension for supporting the child's joints, muscles and weight. The removable floor can be adjusted to various heights inside the bottom cylinder as the child grows in size. The vehicle includes a handle incorporated into an upper portion of the top cylinder for pulling or pushing the vehicle.

15 Claims, 1 Drawing Sheet

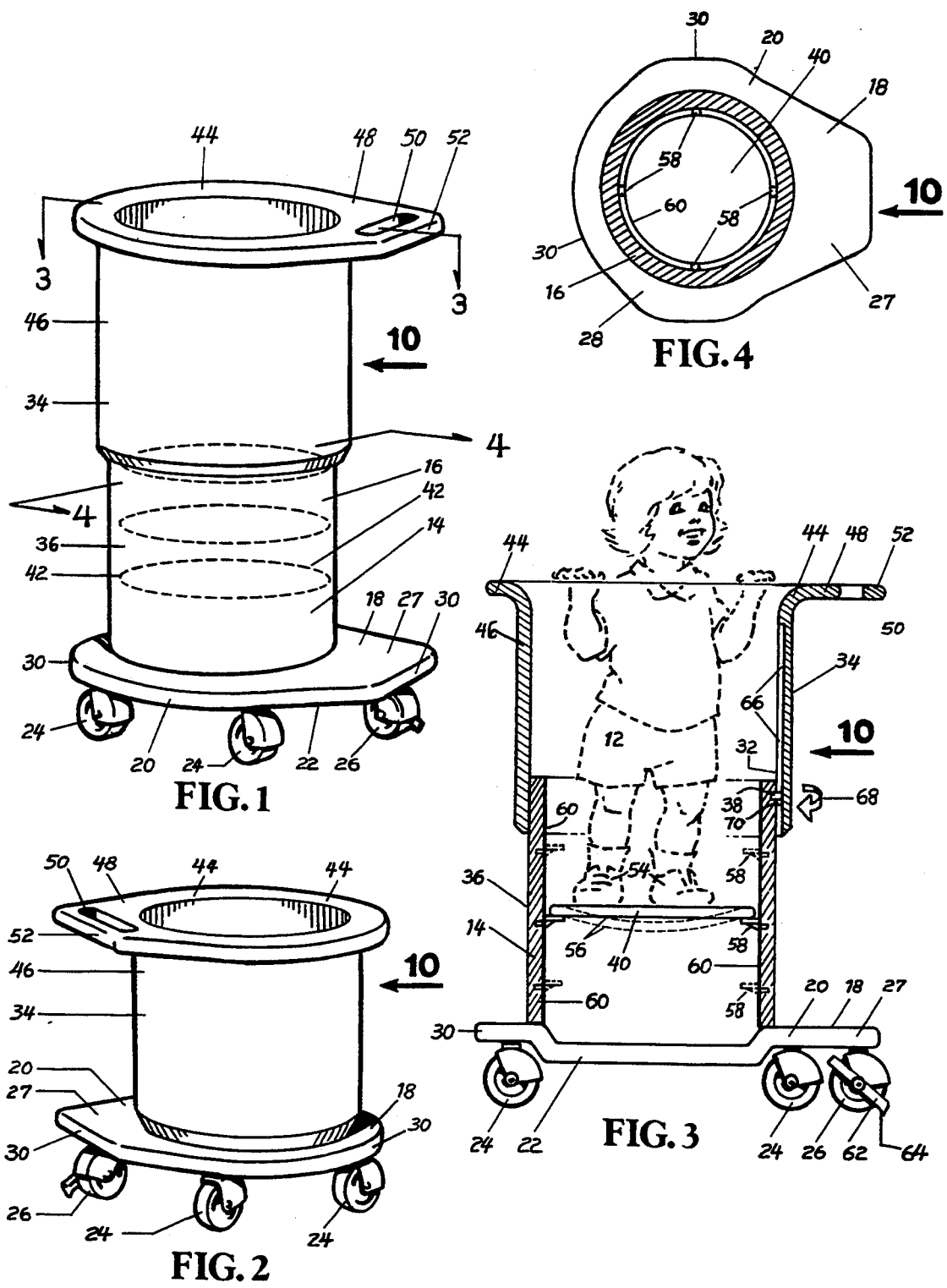

CHILD'S VEHICLE FOR INCREASED VISUAL INTERACTION

BACKGROUND OF INVENTION (a) Field of the Invention

This invention relates to a vehicle for holding and transporting a small child and more particularly, but not by way of limitation, to a wheeled vehicle for holding a small child in an upright standing position for increasing the child's visual interaction with the surrounding environment.

(b) Discussion of Prior Art

Heretofore there have been a variety of different types of strollers and trailers for transporting babies and small children. For example, in U.S. Pat. No. 5,076,599 to Lockett et al. a combination stroller and trailer is shown. This type of stroller limits the vision of a child riding therein since he or she is placed in a supine or sitting position near ground level. Further, most horizontal strollers and trailers have no independent suspension systems and the child is subject to vibration and distress which accumulates during the travel period.

In U.S. Pat. No. 2,544,099 to Malin, U.S. Pat. No. 148,522 to Marcus, U.S. Pat. No. 315,884 to Baker and U.S. Pat. No. 4,723,784 to Muscat different types of a child carrier, a child cart, a walker and a vertical supporter are shown. Also, in U.S. Pat. No. 4,111,445 to Haibeck and U.S. Pat. No. 273,776 to Forrest two different types of vehicles are shown for helping hold a handicap person in an upright position. None of these prior art patents disclose the unique structure and advantages of the subject invention as described herein when addressing the above mentioned problem of transporting a small child who heretofore has limited vision due to being held in a setting or supine position and with eye contact near ground level.

SUMMARY OF THE INVENTION

In view of the foregoing, it is an object of the present invention to provide a wheeled vehicle for holding a small child safely and comfortably upright in a standing position so that the child has increased visual interaction with his or her surrounding environment.

Another object of the invention is to provide a vehicle that maintains a child's body in a correct, safe and comfortable alignment with their head, neck and eye movement positions.

Still another object of the subject wheeled vehicle is the elimination of transporting a small children by placing them in supine or sitting position in a stroller with no suspension system and little visual range.

A further object of the invention is to allow a small child freedom and ease of movement in the subject vehicle which provides maximum strength and safety for the child.

Yet another object of the child's vehicle is to hold the child in a standing position elevated above the ground level for improved vision of the surrounding environment and in seeing exhibits, displays and events as they pass by. The majority of standard displays are too tall for a small child and the subject vehicle helps eliminate this disparity. Also, the child is able to move in a complete 360 degree circle within the carrier for observing the world through fresh young eyes.

A further object of the invention is safety to others. Heretofore horizontal strollers were backed into, fallen over and pushed into the legs of others. Also horizontal strollers require a 5 to 10 foot turning radius which proves to be difficult in a crowed area. The invention has a very short turning radius, take up less room and because it stands over 3 feet in height the vehicle is more easily seen and avoided by others for their safety and the small child being transported.

The subject child's carrier includes a lower portion of a bottom cylinder mounted on top of wheeled horizontal base frame. Sides of the horizontal base frame extends outwardly from the bottom cylinder and the outer edges of the sides of the base frame act as a bumper should the child's vehicle accidently contact the sides of a wall or other object. An inner circumference of a top cylinder is slidably received around a portion of an outer circumference of the bottom cylinder. The top cylinder is designed to telescope upwardly from the bottom cylinder. The top cylinder is secured to the bottom cylinder using a locking pin. A removable flexible floor is mounted inside the bottom cylinder and is suspended therefrom. The flexible floor provides a "shock absorber" type suspension for supporting the child's joints, muscles and weight. The removable floor can be adjusted to different heights inside the bottom cylinder as the child grows in size. The vehicle includes a handle incorporated into an upper portion of the top cylinder for pulling or pushing the vehicle.

These and other objects of the present invention will become apparent to those familiar with different types of baby and child strollers and trailers from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of the subject child's vehicle wherein a top cylinder is in an upwardly telescoped position from a bottom cylinder for receiving a small child therein. The cylinders are mounted on a wheeled horizontal base frame.

FIG. 2 is a perspective view of the invention wherein the top cylinder is unlocked from the bottom cylinder and lowered downwardly around the lower cylinder for ease in storage when the vehicle is not in use.

FIG. 3 is a front sectional view of the child's vehicle taken along lines 3—3 shown in FIG. 1.

FIG. 4 is a top sectional view of the child's vehicle taken along lines 4—4 shown in FIG. 1.

DESCRIPTION OF THE PREFERRED EMBODIMENTS

In FIG. 1, a perspective view is shown of the wheeled vehicle for holding a small child upright in a standing position so that the child has increased visual interaction with his or her surrounding environment. The wheeled vehicle is designated by general reference numeral 10. The vehicle 10 maintains the child's body in a correct, safe and comfortable alignment with their head, neck and eye movement positions. A lower body 12 of a child is shown in dotted in FIG. 3 and received inside the vehicle 10. The vehicle 10 includes a lower portion 14 of a bottom cylinder 16 mounted a top 18 of wheeled horizontal base frame 20. Attached to a bottom 22 of the frame 20 are four caster wheels 24 and a fifth wheel 26 mounted on the bottom 22 of a rear portion 27 of the base frame 20. The wheels 24 and 26 obviously provide for ease in moving the vehicle 10 from one location to another. The fifth wheel 26 provides additional stability and aids in steering the vehicle 10. Sides 28 of the horizontal base frame 20 extends outwardly from the bottom cylinder 16 with outer edges 30 of the sides 28 acting as a bumper should the child's vehicle 10 accidently contact the sides of a wall or other object.

An inner circumference 32 of a top cylinder 34 is slidably received around a portion of an outer circumference 36 of the bottom cylinder 16. The top cylinder 34 is designed to telescope upwardly from the bottom cylinder 16 and give the vehicle a height of over 3 feet or greater. The top cylinder 34 is secured to the bottom cylinder 16 using a locking pin 38 shown in FIG. 3. A removable flexible floor 40 is mounted inside the bottom cylinder 16 and is suspended therefrom. The flexible floor provides a "shock absorber" type suspension for supporting the child's joints, muscles and weight. The floor 40 is seen in detail in FIG. 3 and is shown in three different positions in FIG. 1 as dotted lines 42. The removable floor 40 is designed to be removed and adjusted for different heights inside the bottom cylinder as the child grows in size.

The vehicle 10 also includes an outwardly extending annular lip 44 incorporated into and around an upper portion 46 of the top cylinder 34. The lip 44 includes an enlarged portion 48 extending toward the rear of the vehicle 10 with an elongated opening 50 and handle 52 formed in the enlarged portion 48. The handle 52 is used to grip with a hand with the fingers of the hand received through the opening 50 for pulling or pushing the child's vehicle 10 down sidewalks and through walkways, parks, exhibits, shopping areas and the like.

In FIG. 2, the top cylinder 34 is unlocked from the bottom cylinder 16 and has been lower with the inner circumference 32 of the top cylinder 34 sliding down and around the outer circumference 36 of the bottom cylinder 16. The child's vehicle 10 in this collapsed position is ready for easy storage in an automobile or at home until it is again needed for the benefit of the young child and ease in transporting the child.

In FIG. 3, a side sectional view of the vehicle 10 is shown taken along lines 3—3 in FIG. 1. In this view, the lower body 12 of the child can be seen with his or her feet 54 resting on top of the floor 40. The floor 40 may be made similar to a trampoline, or of a soft flexible but durable material so that a "shock absorber" type suspension is provided in supporting the child's joints, muscles and weight thereby giving the child a soft shock free ride while being transported from one place to another. The flexibility of the floor 40 is emphasized by dotted lines 56. The floor 40 is suspended by removable hanger brackets 58 which are spaced around an inner circumference 60 of the bottom cylinder 16. Also hanger brackets 58 are shown in dotted lines above and below the floor 40 for removing and adjusting the height of the floor 40. For example, a very young child or toddler would have the floor removed and placed on the upper brackets 58 shown in dotted lines in FIG. 3. As the child grew and became taller, the floor 40 would be lowered to it's present position and later could be dropped to the lowest position of the brackets 58 shown in dotted lines.

In this view, two of the caster wheels 24 can seen mounted on the bottom 22 of the base frame 20 along with the fifth wheel 26 mounted on bottom of the rear portion 27 of the frame 20. As mentioned above, the fifth wheel 26 acts to improve the stability of the vehicle 10 along with aiding in turning the vehicle 10 within short turning radius of less than 3 feet. The fifth wheel 26 includes a foot brake 62 with a pointed end 64 used for engaging a ground surface and holding the child's vehicle 10 in place when the vehicle is in a resting position.

The inner circumference 32 of the top cylinder 34 includes a vertical groove 66 along the length of the top cylinder 34 for receiving the outwardly extending locking pin 38 attached to the outer circumference 36 of the bottom cylinder 16. As the top cylinder 34 telescopes upwardly on the bottom cylinder 16, the pin 38 rides in the grove 66. When the top cylinder 34 is close to being fully extended as shown in FIGS. 1 and 3, the top cylinder 34 is rotated as shown by arrow 68 and the pin 38 is moved into a horizontal notch 70 adjacent the groove 66. When this is completed the top cylinder 34 is in a locked position on top of the bottom cylinder 16 as shown. By reversing the direction of rotation shown by the arrow 68, the pin 38 is moved into an unlocked position with the pin 38 received in the grove 66 for lowering the top cylinder 34 as shown in FIG. 2.

In FIG. 4, a top sectional view of the child's vehicle 10 is shown taken along lines 4—4 shown in FIG. 1. In this view the annular shaped flexible floor 40 can be seen received on a plurality of hanger brackets 58 received in the sides of the bottom cylinder 16. In this view the sides 28 of the base frame 20 are shown extending outwardly from the lower portion of the bottom cylinder 16 with the outer edges 30 acting as bumpers should the vehicle accidently contact the sides of a wall, curb or like object.

Referring back to FIG. 3, it can be appreciated that a small child received inside the top and bottom cylinders 34 and 16 would rest his or her hands on top of the rounded annular lip 44. The child has a full visual field and can easily and comfortably move in a 360 degree circle inside the vehicle 10 and view the world around in a standing and elevated position. It is important to note that 2-5 year old children need to view their environment and interactively learn from it in a vertical position and not a sitting or supine position simply for increased brain activity and for visual interpretation to be more accurate. The radius of vision is more available and less fatiguing when one is able to see through a standard standing line of vision.

Observing the world from a seated position close to the ground as in a stroller places stress on the neck and spinal column as well as the eyes are used and moved in an inefficient manner. A child placed in a stroller is subject to prolonged convergence of the eyes on near objects or focusing the eyes near and far on areas of displeasing crowds, congestion of legs and moving bodies. This type of viewing is uncomfortable and provides little visual relaxation. Also, this type of eye discomfort could over time prove to be damaging. Further, vertical movement of the eyes, whether sitting or standing is more difficult than horizontal movement. Therefore, standing in the above described child's vehicle 10 is far less fatiguing on the child's vision than sitting in a standard stroller. A child's horizontal vision in a stroller is greatly limited to approximately 90 degrees from left to right when compared to a full range of horizontal vision when standing in the subject invention.

Referring now to the advantages of using the flexible floor 40 in conjunction with the bottom cylinder 16, vibrations that are sympathetic with the natural frequencies of various body parts cause the highest biological effects. Organs and members of the body have different natural frequencies. A standing child has but one vibrational zone with which to cope, the vertical vibration. A seated, prone or supine child is sensitive to two or more vibrational hazards. One hazard is seated to vertical and transverse vibrations and a second hazard is prone or supine to longitudinal and transverse vibrations. Therefore, the subject invention is designed to absorb the shock of wheels on a surface thus reducing the amount of vibration and distress that has ben known to accumulate within a child's body in horizontal strollers. The suspension of the flexible floor 40 dissipates the vertical vibrational field, both down and away from the standing child. It is worth noting that in walking, the natural frequency is about 1–1.5 Hz which is about the same as within the child's vehicle 10 and is considered to be within normal and comfortable limits of vibrational zones for a child.

Still further it is worth mentioning that G forces are measurements based on the acceleration due to gravity against the body. When a child is sitting in a stroller, he or she is subject to a forward G force along with downward and upward G forces. Over a prolonged period of time, the applied G forces when sitting in a stroller can effect the vision of the child. Field studies suggest ½ to 1 G force acting on a child will effect visual acuity and over time result in reduced vision and head pains. The subject invention through it's objects and advantages eliminates the above mentioned problems associated with the ongoing use of a child placed in a horizontal stroller.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A vehicle for holding a small child upright in a standing position so that the child has increased visual interaction with the surrounding environment, the vehicle comprising:

a first upright hollow cylinder dimensioned in size for receiving a lower portion of the child therein;

an elevated flexible floor suspended inside said first upright hollow member for providing a "shock absorber" type suspension for the child's joints, muscles and weight when the child stands and jumps thereon;

adjustment means for suspending said flexible floor at a plurality of different elevations within said first upright hollow cylinder; and a base frame having a plurality of wheels mounted thereon, said first upright hollow member mounted on top of said base frame.

2. The vehicle as described in claim 1 further including a second upright hollow cylinder attached to said first upright hollow cylinder, said second upright hollow cylinder receiving a portion of the child therein.

3. The vehicle as described in claim 2 wherein a bottom portion of said second upright hollow cylinder is slidably received around a top portion of said first upright hollow cylinder and secured thereto.

4. The vehicle as described in claim 2 further including locking means for releasably securing said second upright hollow cylinder to said first upright hollow cylinder.

5. A vehicle for holding a small child upright in a standing position so that the child has increased visual interaction with the surrounding environment, the vehicle comprising:

a first upright cylinder dimensioned in size for receiving a lower portion of the child therein;

a second upright cylinder attached to said first cylinder, said second upright cylinder dimensioned in size for receiving a lower portion of the child therein, wherein an inner circumference of said second cylinder is slidably received around a portion of an outer circumference of said first cylinder, said second cylinder designed to telescope upwardly from said first cylinder;

an elevated flexible floor suspended inside said first upright cylinder for providing a "shock absorber" type suspension for the child's joints, muscles and weight when the child stands and jumps thereon; and a wheeled horizontal base frame, said first upright cylinder mounted on top of said base frame.

6. The vehicle as described in claim 5 wherein said second upright cylinder is secured to said first upright cylinder using locking means for releasably securing said second upright cylinder on said first upright cylinder.

7. The vehicle as described in claim 5 wherein said elevated floor is adjustable along a vertical height of an inner circumference of said first upright cylinder.

8. The vehicle as described in claim 5 wherein said second cylinder includes a handle incorporated into a top portion of said second cylinder.

9. A vehicle for holding a small child upright in a standing position so that the child has increased visual interaction with the surrounding environment, the vehicle comprising:

a first upright cylinder dimensioned in size for receiving a lower portion of the child therein;

a second upright cylinder having a lower portion releasably attached to an upper portion of said first upright cylinder, said second upright cylinder dimensioned in size for receiving a lower portion of the child therein, wherein an inner circumference of said second cylinder is slidably received around a portion of an outer circumference of said first cylinder, said second cylinder designed to telescope upwardly from said first cylinder;

an elevated flexible floor adjustably mounted inside said first upright hollow member for providing a "shock absorber" type suspension for the child's joints, muscles and weight when the child stands and jumps thereon; and a wheeled base frame, said first upright cylinder mounted on to of said base frame.

10. The vehicle as described in claim 9 wherein sides of the said frame extends outwardly from said first cylinder and an outer edges of the sides of said frame act as a bumper should the child's vehicle accidently contact the sides of a wall or other object.

11. The vehicle as described in claim 9 wherein said second cylinder is secured to said first cylinder using a locking pin and the like, when said locking pin is released said second cylinder is lowered on and around said first cylinder.

12. The vehicle as described in claim 9 further including a fifth wheel mounted on the bottom of said frame for providing stability and improved steering of the vehicle.

13. The vehicle as described in claim 12 further including a foot brake attached to said fifth wheel, when said foot brake is applied, the vehicle is held in place on a ground surface.

14. The vehicle as described in claim 12 wherein said second cylinder includes an annular lip form around a top of said second cylinder, said annular lip having an enlarged portion with a handle incorporated therein for pulling or pushing the vehicle.

15. The vehicle as described in claim 14 wherein said handle is disposed at the rear of the vehicle and disposed above said fifth wheel on said frame.

* * * * *